J. G. SMITH.
Agricultural-Boilers.
No. 146,954.
Patented Jan. 27, 1874.
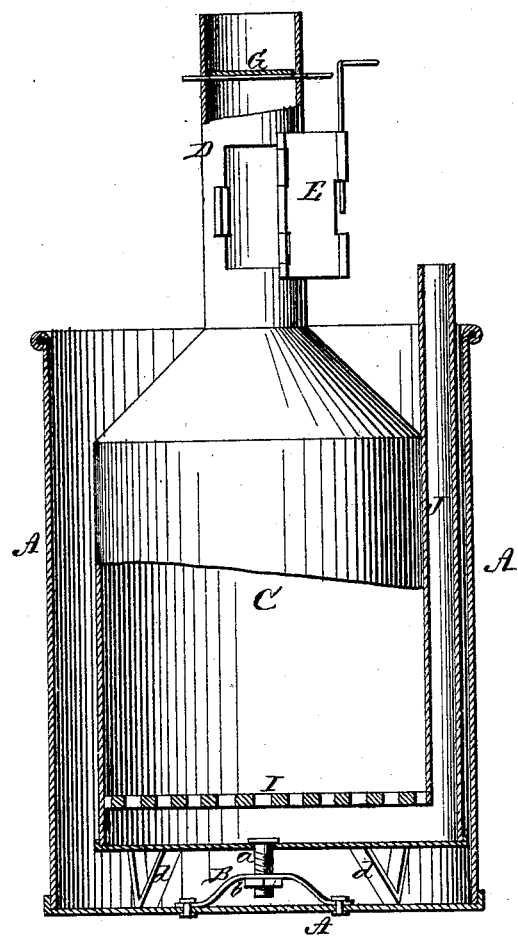
Witnesses
John A. Ellis
C. L. Ewell
Inventor
Joseph G. Smith
Per
T. N. Alexander & Co
Att'ys

UNITED STATES PATENT OFFICE.

JOSEPH G. SMITH, OF FREEPORT, ILLINOIS.

IMPROVEMENT IN AGRICULTURAL BOILERS.

Specification forming part of Letters Patent No. 146,954, dated January 27, 1874; application filed April 24, 1873.

*To all whom it may concern:*

Be it known that I, JOSEPH G. SMITH, of Freeport, in the county of Stephenson and State of Illinois, have invented certain new and useful Improvements in Device for Cooking Food for Cattle; and I do hereby declare that the following is a full, clear, and exact description thereof, reference being had to the accompanying drawings, and to the letters of reference marked thereon, which form a part of this specification.

The nature of my invention consists in the construction and arrangement of a steamer or heater for cooking food for cattle, as will be hereinafter more fully set forth.

In order to enable others skilled in the art to which my invention appertains to make and use the same, I will now proceed to describe its construction and operation, referring to the annexed drawing, which represents a vertical section of my invention, a part of the heater being shown in side view.

A represents a vessel of any suitable dimensions, made of wood or metal, as may be desired, to contain the water to be heated for cooking food for cattle. On the bottom of the vessel A is secured a foot, B, to which the heater is secured by a bolt, *a*, and nut *b*, so as to prevent the same from rising in the water. C represents the heater, provided with feet *d d*, resting upon the bottom of the vessel A. This heater is cylindrical, or any other suitable shape, the upper end being conical, and terminating in the smoke-pipe D. In the pipe D is a door, E, through which the fuel is admitted, and there is also a damper, G, in the pipe, by means of which the draft, and consequently the heat, is easily regulated. Along the side of the heater C is a pipe or chamber, J, extending down to and communicating with the heater below a grate, I, located within the same. This pipe supplies air to the fire, and by its location outside of the heater the draft is greatly increased, thus enabling the operator to keep up a brisk fire. The fire being located on the grate I protects the bottom of the heater from burning out. The steam from the boiling water in the vessel A is to be conveyed by suitable pipes to the vessel in which the food to be steamed or boiled is placed.

Having thus fully described my invention, what I claim as new, and desire to secure by Letters Patent, is—

In combination with the exterior water-holding vessel A, the interior fuel-holding vessel C, with feet *d d*, the foot B, and the bolt and nut *a b*, for preventing the contact of the bottoms of the vessel, and the rising of the vessel C within the vessel A, all constructed substantially as and for the purposes set forth.

In testimony that I claim the foregoing as my own I affix my signature in presence of two witnesses.

JOSEPH G. SMITH.

Witnesses:
   A. T. GREEN,
   WILLIAM WIMER.